(12) United States Patent
Rubbert

(10) Patent No.: US 6,495,848 B1
(45) Date of Patent: Dec. 17, 2002

(54) EVALUATION OF PROJECTION PATTERN FOR TRANSITIONS IN PATTERN TO DETERMINE SPATIAL STRUCTURE OF 3D SURFACES

(75) Inventor: Rüdger Rubbert, Berlin (DE)

(73) Assignee: OraMetrix, Inc., Dallas, TX (US)

( * ) Notice: Subject to any disclaimer, the term of this patent is extended or adjusted under 35 U.S.C. 154(b) by 0 days.

(21) Appl. No.: 09/673,963

(22) PCT Filed: Apr. 29, 1999

(86) PCT No.: PCT/DE99/01277

§ 371 (c)(1),
(2), (4) Date: Nov. 30, 2000

(87) PCT Pub. No.: WO99/60332

PCT Pub. Date: Nov. 25, 1999

(30) Foreign Application Priority Data

May 14, 1998 (DE) ......................................... 198 21 611

(51) Int. Cl.⁷ ............................................... G01N 21/86
(52) U.S. Cl. .................................. 250/559.22; 356/610
(58) Field of Search ..................... 250/559.19, 559.22, 250/559.04; 356/603, 610, 625, 3.03; 382/174

(56) References Cited

U.S. PATENT DOCUMENTS

| | | | |
|---|---|---|---|
| 4,634,278 A | 1/1987 | Ross et al. | 356/376 |
| 4,825,263 A | 4/1989 | Desjardins et al. | 356/376 |

(List continued on next page.)

FOREIGN PATENT DOCUMENTS

| | | | |
|---|---|---|---|
| DE | 4436500 A1 | 5/1995 | |
| DE | 1963727 A1 | 3/1998 | |
| DE | 19638727 A1 | 3/1998 | |
| EP | 0294577 | 12/1988 | |

OTHER PUBLICATIONS

Yee et al., "Three Dimensional Imaging System", *Optical Engineering*, vol. 33, No. 6, (Jun. 1, 1994).

*Primary Examiner*—Stephone B. Allen
*Assistant Examiner*—Bradford Hill
(74) *Attorney, Agent, or Firm*—McDonnell Boehnen Hulbert & Berghoff

(57) ABSTRACT

The present invention concerns a process for detecting the spatial structure of a three-dimensional surface by projection of a pattern on to the surface along a projection direction which defines a first axis, and by pixel-wise detection of at least one region of the pattern projected on to the surface, by means of one or more sensors in a viewing direction of the sensor or sensors, which defines a second axis, wherein the first and the second axes (or a straight line parallel to the second axis) intersect at an angle different from 0° so that the first and the second axes (or the straight line parallel thereto) define a triangulation plane, wherein the pattern is defined at least upon projection into a plane perpendicularly to the first axis by a varying physical parameter which can be detected by the sensor (sensors), and wherein the pattern is such that the difference in the physically measurable parameter, measured between predeterminable image pixels or pixel groups, along a predeterminable pixel row which is preferably parallel to the triangulation plane, assumes at least two different values. In order to provide a process for detecting the spatial structure of a three-dimensional surface, which is substantially independent of different inclinations with respect to a normal to the triangulation plane and also independent of the other surface properties which independently of the spatial extent of the surface can influence the physical parameter to be measured, in accordance with the invention it is proposed that, for the purposes of evaluation of the imaged pattern structure only changes in the physical parameter between the predetermined pixels or predetermined pixel groups of one or more pixel rows which are preferably parallel to the triangulation plane are detected and converted into spatial co-ordinates of the surface.

15 Claims, 3 Drawing Sheets

U.S. PATENT DOCUMENTS

| | | |
|---|---|---|
| 4,867,570 A | 9/1989 | Sorimachi et al. ........... 356/376 |
| 5,604,817 A | 2/1997 | Massen et al. ............... 382/120 |
| 5,615,003 A | 3/1997 | Hermary et al. ............ 356/3.03 |
| 5,715,166 A | 2/1998 | Besl et al. ............. 364/474.24 |
| 5,742,294 A | 4/1998 | Watanabe et al. ........... 345/425 |
| 5,792,147 A * | 8/1998 | Evans et al. ................. 606/130 |

* cited by examiner

TRIANGULAR ANGLE APPROX. 30°

TRIANGULAR ANGLE APPROX. 75°

EVALUATION OF PROJECTION PATTERN FOR TRANSITIONS IN PATTERN TO DETERMINE SPATIAL STRUCTURE OF 3D SURFACES

The present invention concerns a process for detecting the spatial structure of a three-dimensional surface by projection of a pattern on to the surface along a projection direction which defines a first axis, and by pixel-wise detection of at least one region of the pattern projected on to the surface, by means of one or more sensors in a viewing direction of the sensor or sensors, which defines a second axis, wherein the first and the second axes (or a straight line parallel to the second axis) intersect at an angle different from 0° so that the first and the second axes (or the straight line parallel thereto) define a triangulation plane, wherein the pattern is defined at least upon projection into a plane perpendicularly to the first axis by a varying physical parameter which can be detected by the sensor (sensors), and wherein the pattern is such that the difference in the physically measurable parameter, measured between predeterminable image pixels or pixel groups, along a predeterminable pixel row which is preferably parallel to the triangulation plane, assumes at least two different values.

Such a process is known for example from U.S. Pat. No. 5 615 003.

The pattern which is specifically disclosed in that patent specification has a very high degree of similarity to bar codes as have already long been in use for example in the retail trade for identifying products and prices, wherein the sequence of lines or bars of different thicknesses defines a series of binary numbers which is clearly associated for example with a product and its price. For the purposes of detecting the spatial structure of a three-dimensional surface however the bar widths and the spacings between bars of that kind are distorted according to the respective specific structure of the surface involved and the known process is distinguished by devices and measures which, in spite of the distortion effect, permit identification of given regions of the bar pattern so that the first distorted pattern can be adapted to the projected pattern, wherein the parameters of such adaptation afford the structure of the surface which produces the above-mentioned distortion effects.

Another similar process which uses an encoded pattern is known from German patent application No 196 38 727, in which respect that process is not limited to encoding of a pattern only in one direction but is composed of individual distinguishable pattern elements each of similar respective structure and size, wherein the pattern elements also differ alternately from each other in mutually perpendicular directions. An encoded pattern is characterised in that at least portions of the pattern which are of a given minimum size are not repeated at any point in the entire pattern surface. Even if that requirement is not satisfied in the strict sense, this means that repetitions of pattern structures can certainly also occur as long as those repetitions are only sufficiently far apart on the pattern surface that, upon evaluation of an imaged pattern structure, there is practically no possibility of confusion between two randomly identical regions of the pattern.

All previously known processes however basically operate on the principle of pattern recognition, that is to say imaging, implemented by calculation, of the flat pattern on to the distorted pattern of which the image is formed from the viewing direction on a non-flat surface. Problems always occur in that respect however when the information content of the projected pattern element can vary in the imaging procedure, depending on the spatial extent or other configuration of the surface. If for example the physical parameter which is to be measured and which varies and by which the pattern structure is defined includes the color of the pattern or of individual pattern elements, then interpretation of color information in the projected pattern can be interfered with or even made impossible, by virtue of the surface being colored in nature. When using different line widths for a pattern the line width in the image depends not only on inclinations of the surface in a direction parallel to the triangulation plane but also inclinations of the object or the surface with respect to a line normal to the triangulation plane. This means that, upon the projection of lines of different width, by virtue of the spatial extent of the surface being of a disadvantageous configuration, for example a narrow line in the image is represented in a width which is of the order of magnitude of the image of a line which is wide in the projected pattern, and accordingly can result in an incorrect item of information in the evaluation procedure.

In addition the evaluation of encoded patterns involving a differing geometrical configuration of pattern elements imposes very high demands on the evaluating data processing procedure as the geometry of the projected pattern elements can recur in severely deformed condition in the image.

In comparison with the above-depicted state of the art, the object of the present invention is to provide a process for detecting the spatial structure of a three-dimensional surface, which is substantially independent of different inclinations with respect to a line normal to the triangulation plane and also independent of the other surface properties which independently of the spatial extent of the surface can influence the physical parameter to be measured.

That object is attained in that, for the purposes of evaluation of the imaged pattern structure only changes in the physical parameter between the predetermined pixels or predetermined pixel groups of one or more pixel rows which are preferably parallel to the triangulation plane are detected and converted into spatial co-ordinates of the surface.

In that respect the changes in the physical parameter are detected at least in the component thereof parallel to the triangulation plane and converted into spatial co-ordinates.

The fact that only changes in the physical measurement parameter of the pattern, which is to be detected, are detected, preferably between adjacent pixels or adjacent pixel groups, means that specific surface properties are so-to-speak eliminated as the surface regions which are imaged or reproduced in particular by adjacent pixels generally have the same properties. The inclination of the surface with respect to a line normal to the triangulation plane also has no effect on detection and possibly identification of the pattern structure as it is not the pattern that is detected in respect of its specific dimensions and shapes and compared to the original projection pattern and adapted thereto, but only the values of the physical parameter which is of interest, being measured in predetermined preferably adjacent pixels or pixel groups, are compared to each other, more specifically by forming the difference thereof. In that case the specifically imaged pattern is then produced simply on the basis of characteristic changes in the physical parameter from given pixels to other predetermined pixels, in particular their adjacent pixels, or from given pixel groups to other predetermined and preferably adjacent pixel groups, or along another suitable sequence of pixels which are to be compared together.

As in accordance with the invention the change in the values, which are detected or reproduced in the image pixels, of the specifically evaluated physical parameter, can assume at least two different values, those differing values in respect of the change, which can occur from one pixel to another or from one pixel group to another, make it possible to define and recognise structures without the specific properties of the surface playing a part in that respect.

Desirably the pattern is so oriented that, in a predetermined measurement direction along which pixels or pixel groups are compared to each other, there are change values which are at a maximum in respect of amount at least in part while the other change values which occur are comparatively small in respect of amount or are of the value zero.

In a preferred variant of the present invention a respective plurality of pixels, which are disposed in mutually superposed relationship in a column, of pixel rows which are adjacent in the column direction, are assembled to form a pixel group, and the changes in the physical parameter are evaluated between respective ones of such pixel groups which are adjacent in the line direction. It would however also be possible to compare groups of adjacent pixels which each comprise a plurality of pixels disposed in juxtaposed relationship in the line direction. In a variant of that configuration, the pixels which are assembled to form a respective group, from a plurality of lines, can also be displaced relative to each other, that is to say they can originate from different columns which however are preferably in close proximity with each other.

It will be appreciated moreover that the 'lines' and 'columns' of pixels of an image sensor or image, as those terms are used in the context of the present application, do not necessarily have to extend along straight lines which intersect in mutually perpendicular relationship.

A particularly preferred embodiment of the invention is one in which the pattern is in the form of an encoded pattern, in which respect that requirement is not to be interpreted in a strict sense.

Desirably the pattern structures are relatively small in comparison with the overall extent of the pattern and also the minimum size of the surface regions which have a pattern structure which is not repeated should be as small as possible in comparison with the overall surface area of the pattern as in that way the respective clearly identifiable pattern structures can be suitably accurately located. Pattern repetitions however may also occur at a sufficiently large spacing in many situations of use.

A further preferred embodiment of the invention is one in which the pattern is formed by individual pattern elements which each occupy approximately equal areas in a plane perpendicular to the projection direction. The equal-size surface regions of individual elements facilitate the evaluation procedure if for example transitions from one pattern element to another are particularly pronounced and are thus clearly detected or if given regions of individual pattern elements have substantial changes in the physical parameter to be measured, in the line direction of the image pixels, and thus serve as a pattern recognition point which can be well located.

In that respect a particularly preferred embodiment of the present invention is one in which there are at least two types of pattern elements, in the region of which the physical parameter is respectively of a constant level or a constant value, wherein that value of the physical parameter in question respectively clearly measurably differs between the two types of pattern elements. In that way it is very easily possible to establish the transitions from a pattern element of the first type to a pattern element of the second type and vice-versa. The differences which are formed between adjacent pixels or pixel groups assume the value zero, in regard to pattern elements of that kind, if the pixels or pixel groups which are to be compared are within the same pattern element and assume the clearly measurable distinguishing value as between the two types of pattern elements when the one pixel or the one pixel group forms the image of one of the two pattern elements while the adjacent pixel or the adjacent pixel group does so for the respective other pattern element. In that way, respective clearly measurable changes occur at the transitions from one pattern element to another and in that respect also measurement points for identification of the pattern structure and the position of such transitions. That applies even if the surface properties of the article being investigated change considerably in the projected pattern region so that the same transitions between identical pattern elements but at different locations on the surface show clearly different differences and are nonetheless recognised as similar transitions because the difference in both cases always still clearly differs from other difference values which occur (for example the difference value zero).

In addition a preferred embodiment of the present invention is one in which there is provided at least one type and at least one further type respectively of a pattern element, in the surface region of which the value of the physical parameter to be detected continuously changes in a predetermined direction. With a pattern element of that kind, the changes in the physical parameter between adjacent pixels or pixel groups are generally relatively small, while by virtue of the continuous change in the physical parameter in the region or in a sub-region of that pattern element those change values are respectively equal between all adjacent pixels or pixel groups. It is only in the event of a transition to another pattern element or if a region of the pattern element is reached in which the physical parameter no longer changes continuously in accordance with the previously defined rule that a greater difference in respect of the physical parameter can occur between adjacent pixels or pixel groups, which difference is in turn characteristic of a given region of the pattern.

In that respect a particularly preferred embodiment of the present invention is one in which there are provided two types of such pattern elements with a continuous change in the physical parameter within at least a sub-region of those pattern elements, wherein those two types differ from each other in that, in the predetermined direction, with respect to the progressive comparisons of adjacent pixels or pixel groups, the sign of the change in the physical measurement parameter is precisely reversed. In the surface region in question of the pattern element of a first type therefore the value of the physical parameter which is of interest increases for example from one pixel to another by the same value in each case, while, in regard to the other type of pattern element, that value decreases from one pixel to another by a corresponding amount in each case.

It will be appreciated that, in the transition to an adjacent pattern element, considerably greater differences can occur in the values of the physical parameter between adjacent pixels or pixel groups.

The pattern elements with a change in the physical parameter, which is more or less continuous at least in a region-wise manner, make it possible, in regard to the transition to adjacent pixels or pixel groups, to obtain at the transition to a further pattern element a clear jump in the physical parameter in the same direction in each case, while in regard to the previously defined types of pattern elements within whose surface region the physical measurement parameter is of a constant respective value, the sign of the change in regard to the transition to the next pattern element, if there is any change at all, is clearly established by the value of the physical parameter in the preceding pattern element.

In that respect, the change may admittedly assume two different values which respectively differ from each other by their sign, depending on from which of the two types of pattern elements the transition to the respective other type occurred, but after a previously implemented positive change in the value of the physical measurement parameter, in regard to pattern elements of that kind, at the transition to the next pattern element there can be only a negative or no change, and vice-versa. In contrast, with the types of pattern elements which have a change which is continuous in a region-wise manner but which is relatively small between respectively adjacent pixels within those ranges and which therefore can be ignored, the value of the physical parameter is continuously repeatedly restored to a value which has already been achieved previously and which then, at the transition to the next pattern element or also within the given pattern element, is abruptly changed, in which respect that abrupt change is detected as a characteristic structure element of the pattern and involves a given direction or a given sign, wherein changes involving the same sign or for example opposite signs can then readily follow, depending on which respective type of pattern element is the next following and the next but one.

It will be appreciated that, in regard to various types of pattern elements of that kind, it is desirable if those types are arranged in an encoded distribution on the surface of the projected pattern, in which respect the notion of encoded distribution has already been discussed above. A preferred example of encoded distribution is simply random distribution of the various types of pattern elements on the entire projection surface. It is particularly preferred in that respect if all the above-defined types of pattern elements, that is to say both those within whose surface region the physical parameter is of a respective constant level and also those which involve a surface region within which the physical parameter respectively continuously changes, are used for the production of such a pattern.

Desirably the surface region of a pattern element in the imaging plane should correspond at a maximum to a number of m×n pixels, wherein m and n are each greater than 2, but at the same time m is markedly smaller than M and n is markedly smaller than N, when M×N is the total number of the detected or imaged image pixels.

In that respect it is further desirable if, for pattern encoding and identification of pattern elements or characteristic regions of the pattern, the procedure only involves evaluating changes which are greater than the changes between adjacent pixel groups within those types of pattern elements which at least in part have a continuous change in the physical parameter. It has already been mentioned hereinbefore that the small changes in the physical parameter, which occur along that region between adjacent pixels or pixel groups, in comparison with the relatively great changes which can occur between adjacent pattern elements, can be ignored.

Furthermore a preferred embodiment of the invention is one in which two measurement procedures are implemented with triangulation planes which are angled relative to each other, wherein in the two measurement procedures the triangulation planes are preferably angled relative to each other through about 90°.

Evaluation of the image data is substantially facilitated if, upon projection of the pattern on to a reference plane, imaging of the lines of the pattern on the image converter is effected substantially parallel to the lines of the image converter. The term reference plane is used herein to denote that plane which is formed in the following manner: (i) an auxiliary straight line is defined, which extends parallel to the optical axis of the projection unit and which intersects the optical axis of the receiving or recording unit, wherein the plane defined by that straight line and the optical axis of the recording unit, in accordance with the invention, is identified as the 'triangulation plane'; (ii) the bisector of the optical axis of the recording unit and the auxiliary straight line is established as a normal vector of the reference plane (the reference plane is thus perpendicular to the triangulation plane); (iii) the reference plane is so disposed that the spacing between the points at which the two optical axes pass through the reference plane is at a minimum. That definition takes account of the fact that the two optical axes, in a real apparatus, will not exactly intersect, even if that is structurally intended. If now the lines of the pattern extend parallel to the triangulation plane, the image of those lines on the image converter will extend parallel to the lines of the image converter. Upon projection of that pattern on to a surface which does not correspond to the reference plane, the deviation from parallelism will only be small of second order.

It is also advantageous if the pattern is such and projection of that pattern is effected in such a way that, upon projection of the pattern on to a flat surface which is perpendicular to the triangulation plane, with a unitary surface configuration, the result is a structure which is organised in lines, those lines are parallel to the triangulation plane and the characteristic above-specified measurements of the change occur along those lines.

It is further desirable if (i) the pattern is projected using a beam source and suitable optical means on to the object to be measured; (ii) the pattern to be projected is of a flat or a real configuration, with substantially mutually perpendicular lines and columns involving a respectively uniform pitch division and arranged in the resulting pitch division are different geometrical elements which are optically transparent, non-transparent or partially transparent; (iii) the transparency of the partially transparent elements both increases in the line direction steadily from non-transparent to transparent or steadily decreases from transparent to non-transparent; (iv) the geometrical elements are arranged in the pattern to be projected, in such a way that in the pitch division of the columns, as between the geometrical elements, there is a change from transparent to non-transparent or from non-transparent to transparent, in such a way that the different sign, which is distributed over the pattern, of the size of the change in the pitch division grid or raster of the columns, on the basis of image recording of the projected pattern of interrelated surface segments of the object, which are delimited in any desired fashion, of sufficient size, makes it possible to determine a clear association with the respective projected part of the pattern; (v) the radiation reflected by the object, at least in parts, is projected by suitable optical means on to a flat CCD image converter whose radiation-sensitive elements are also organised in lines and columns, and is converted thereby into an electrical signal and contained in that electrical signal is the information content of the components, reflected by the object, of the projected pattern, at least in parts thereof; (vi) the directions of the optical axes for projection of the pattern and for formation of the image of the object on the image converter are different from each other; (vii) the lines of the pattern to be projected are oriented parallel to the plane which is formed by the optical axes for projection and for imaging of the reflected radiation on to the image converter; (viii) the electrical signals of the image converter are converted into discrete data and passed to a unit for processing and storage of data; (ix) the data of the radiation-sensitive elements of the image converter are evaluated in lines which are parallel to the triangulation plane, in regard to the size of the change in the intensity of radiation; (x) the resulting flanks upon substantially sharp changes, in accordance with the respective sign of the size of the change, are associated with the binary information elements zero and one; and (xi) the resulting binary sequences serve to distinguish parts of the pattern from other parts of the pattern.

If for example a pattern (i) comprises checkered black and white elements, (ii) the pattern is projected using visible light and suitable optical means on to a white object of any three-dimensional extent, (iii) an image is produced from the object using suitable optical means on a flat image converter, (iv) the projection direction is different from the receiving or recording direction, (v) the signal of the image converter is digitised, put into intermediate store in an electronic memory or storage device and fed to a data processing unit, (vi) the image converter is organised in mutually perpendicular lines and columns, (vii) the pattern is positioned in the projection device in such a way that the lines of the checkered pattern extend in the direction of the lines of the image converter, (viii) both the projection device and also the receiving or recording device are of such a configuration and position that the triangulation angle extends to a recording of the image of the checkered pattern in the column direction of the image converter (in other words: the plane defined by the triangulation angle extends in the direction of the columns of the projected pattern and also the image converter), (ix) the configuration of the pattern elements is greater than the resolution of the image converter, then values can be found in the image store, which represent the line information of the image converter and which correspond to the brightness values of the white and black elements of the checkered pattern. If (x) those items of information are evaluated along the corresponding line of the image converter, the result is sudden changes in the items of brightness information corresponding to the grid or raster of the projected pattern. The deviations in the dimensional relationships of the sudden changes in brightness along an image line with respect to the corresponding projected pattern represent the spatial extent of the object, with the beam path being known. If (xi) the object in the region being viewed is sufficiently steady and is optically accessible both from the projection direction and also from the receiving or recording direction, then the sequence of line information alternately involves sudden changes in brightness from light to dark and from dark to light. If (xii) the items of brightness information are represented by the digitisation procedure as digital values with an association proportional to the brightness values and if (xiii) the change in brightness along the designated column of the image converter is calculated from the difference between the respective brightness value at a given location and the brightness information of the image location which follows in the direction of the line, that alternately gives positive and negative values which correspond to the size of the change in brightness. If that discrete sequence of values is interpreted as a brightness signal, it is then possible to refer to positive or negative flanks or edges of that signal.

In the preferred embodiment of the invention the image data which represent the projected pattern with the stated statistical distribution of the pattern elements and thus the corresponding encoding are checked in respect of the individual pattern elements to ascertain whether the information content of the individual element can be unambiguously recognised on the basis of the recording. If that unambiguity is not guaranteed then the corresponding pattern element is to be excluded from further data processing. The pattern elements which are to be unambiguously recognised, by signal edge recognition and evaluation, form the basis thereafter for generation of the information elements, and adjacent unambiguously recognised information elements are attributed to so-called clusters. A cluster in the sense of the present invention is a group of adjacent information elements. The comparison of the decoded items of information of the recorded pattern which is projected on to the object, with the pattern content to be projected, makes it possible to check the plausibility of the arrangement of the decoded items of information. If deviations occur in that situation, the deviating information element is falsified and separated out. If the corresponding information element is at the edge of the cluster, a suitably corrected delimitation is produced. If the information element is in the middle of a cluster, then under some circumstances the cluster is to be divided and the unambiguous association of the two resulting cluster portions is to be re-checked. If the smaller clusters cannot be unambiguously associated, then all corresponding elements are to be falsified and separated out. Accordingly, represented in the clusters are interrelated surface segments whose pattern elements of the projected pattern, by virtue of the information content available in the cluster in respect of the mutually adjoining pattern elements, can be unambiguously associated with the corresponding pattern element in the pattern to be projected. On the basis of the position for example of the center of gravity or the resulting edges or flanks in the image, in comparison with the arrangement in the pattern to be projected, it is possible by means of triangulation to calculate three-dimensional coordinates as support points of the surface of the object. In accordance with the invention three respective adjacent support points which are not disposed in a row can advantageously be defined as a triangle and thus also as a triangular surface so that there is no need for surface retrieval from a cloud of points, as is required in the case of other processes. As a result of that analysis and calculation of the items of image information from an individual image digital images of interrelated surface segments of the object, which are unambiguously determined in respect of their configuration, are available. These segments which are possibly not interrelated are however known in terms of their three-dimensional position and orientation relative to each other.

Further advantages, features and possible uses of the present invention will be apparent from the following description of a preferred embodiment and the accompanying drawings in which:

FIG. 1 shows in the upper region thereof a section from an encoded pattern, more specifically in a plane perpendicular to the axis of projection, and in the lower region the structures which are afforded by the evaluation process in accordance with the present invention.

Figure 1:
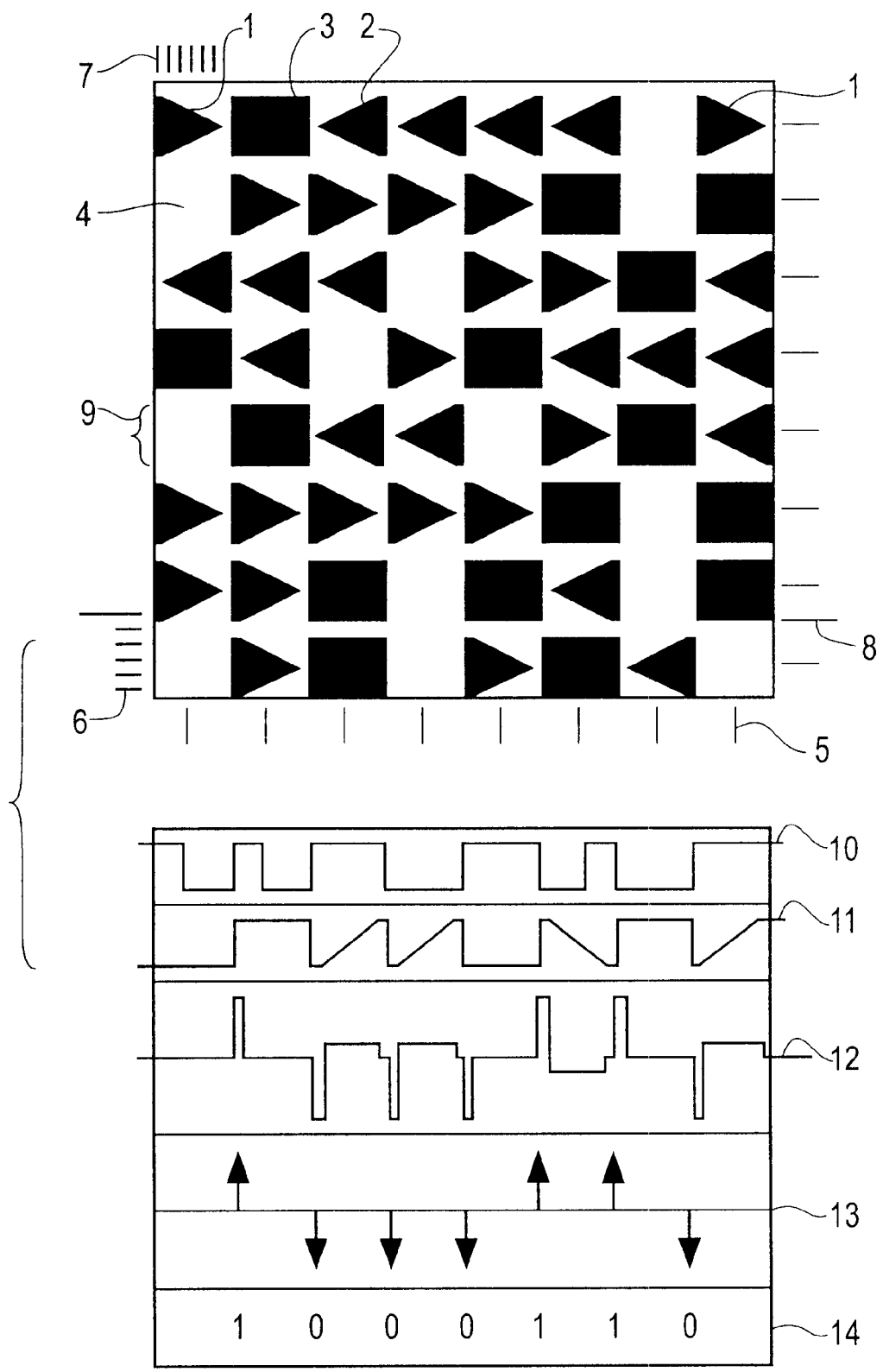
FIG. 1 shows a section from an encoded pattern and in the lower part aspects of an evaluation strategy.

The pattern illustrated in FIG. 1 shows a square field or array of 8×8 pattern elements with a total of four different pattern element types. At the same time, laid over the imaged pattern there is also a grid network of image pixels, on to which a corresponding pattern can be projected for imaging purposes. As will be seen, each pattern element occupies a surface region of 8×5 image pixels. The four different pattern element types are all recognisable within the top left region of 3×2 pattern elements. In this case, by way of example, the degree of blackening of a pixels or the degree of blackening of a group each comprising five mutually superposed pixels can be used as a physically measurable parameter for identification of the pattern structures. It will be appreciated that conversely it would also be possible to use a negative of that pattern, in which black surfaces would be substituted for white surfaces.

In the case of the pattern element at topmost right in FIG. 1, the left-hand degree has the maximum degree of blackening of that pattern which occurs, while then the degree of blackening continuously decreases from left to right and could be specifically detected as the sum of the degrees of blackening of all five pixels elements in a column one above the other, which fall into the surface region of that pattern element. The eighth group of five pixels of that pattern element, which are arranged in mutually superposed relationship in a column, no longer has any degree of blackening and is completely white. Beside it to the right there follows a further pattern element 3 which has the maximum degree of blackening over its entire surface. That pattern element 3 is here specifically identified by reference numeral 1.

The next following pattern element 2 is substantially similar to the pattern element 1, with the single difference that the degree of blackening of the eight pixel groups of that pattern element, which are arranged in column-wise manner, continuously increases from left to right, while it continuously decreased in the case of the pattern element 1.

Under the pattern element 1 it is possible to see a pattern element 4 which differs from the pattern element 2 in that it has no degree of blackening at all over its entire surface area. In particular the transitions between adjacent pattern elements which can form a transition from white to black or from black to white are characteristic in respect of this pattern, in which respect the pattern elements 1 and 3 also make it possible for identical transitions from black to white or from white to black respectively to be repeated a plurality of times, at successive pattern elements.

This will now be described in greater detail with reference to the lower region in FIG. 1. Attention is directed for example in the upper part of FIG. 1 to the row of pixels identified by reference numeral 8 in the seventh row (counted from the top) of pattern elements of the pattern. When progressing along that line of pixels 8 from left to right and recording in a vertical direction the respective degree of blackening of the detected pixels, then the variation in the degree of blackening shown in line 10 of the lower part of the Figure is the result. Firstly, in line 8 of pixels the degree of blackening is at a maximum value, then at the transition from the third to the fourth pixel of that row it abruptly changes to a minimum value which corresponds to a white pixel. The next five pixels remain white and therefore exhibit the minimum degree of blackening, while at the transition to the next pattern element in that line there is once again a sudden change to the maximum degree of blackening. As that pattern element is identical to the preceding one, the curve configuration is repeated. At the transition to the next pattern element there is once again a sudden change to the maximum degree of blackening which then however also remains constant until the transition to the fourth pattern element which is completely white occurs.

Within the surface region thereof the pixel line 8 which exhibits the degree of blackening remains at the minimum value, as shown in line 10. The continuation of the curve configuration is similar to the foregoing description.

The curve configuration in accordance with line 10 would moreover also occur if five pixels of a column from that row of pattern elements were combined together in each case and if only one threshold value were established for the degree of blackening, above which the curve jumps to its maximum value and below which it assumes the minimum value.

The subjacent curve 11 is obtained in a rather different manner. This respectively reproduces the degrees of blackening of five mutually superposed pixels in the group of pixel rows which are identified in the upper part of the Figure by reference 9 and which define a row of pattern elements. Entirely to the left is a white pattern element 4 so that a minimum degree of blackening is correspondingly indicated in line 11 in the region of that pattern element. Then there is a jump to a completely black pattern element so that then the maximum degree of blackening is reproduced throughout in the region of the second pattern element. There is then once again a sudden change downwardly into a white pixel column without any degree of blackening, but then the degree of blackening continuously increases from one pixel column to another until the maximum degree of blackening is reached again at the end of the third pattern element. That is repeated in the fourth pattern element while the fifth pattern element again corresponds to the first. The sixth pattern element differs from the third and fourth pattern elements only by the sign of the change in the degree of blackening, that is to say in the case of the sixth element the degree of blackening continuously decreases from a maximum initial value from left to right to the minimum value. The seventh pattern element of that row of pattern elements is identical to the second one and the eighth pattern element again corresponds to the third and fourth pattern elements of that row.

Line 12 which is shown therebeneath sets out an evaluation of that structure which could clearly also be described as a derivative of the curve shown in FIG. 11. More specifically line 12 shows the respective differences in the degrees of blackening of two successive pixel columns each comprising five mutually superposed pixels in the row 9 of pattern elements. Those changes are at a maximum at the respective transition from one pattern element to the next pattern element, when that is a transition from a purely black pixel column to a purely white pixel column, or vice-versa. Those changes are of the value zero within the purely white or purely black pattern elements or at a transition (which does not occur here) from a purely white or purely black to a similar pattern element (that is to say from pattern element 3 to 3 or from 4 to 4) and those changes are of a comparatively small value in the region in which the degree of blackening of the pattern elements changes continuously from left to right.

As can be seen from curve 12, in the transition from white to black there is an upward deflection of the curve while at the transition from black to white there is a downward deflection of the curve. The pattern elements with a continuous change in the degree of blackening, here more specifically in the form of triangles, make it possible for a plurality of positive or negative peaks to occur in succession, as can be seen from FIG. 12, which facilitates the production of an encoded pattern.

In line 13 the positive and negative peaks at the region of the pattern element transitions are only replaced by upwardly or downwardly pointing arrows, while line 14 is a binary representation of those arrow directions or peak directions in the form of the digits 1 and 0, wherein positive peaks or upwardly directed arrows are represented by a digit 1 while negative peaks or downwardly directed arrows are represented by a digit 0. In that way the detected structure can be easily processed in the form of digital numbers, more specifically in binary numbers.

Figure 2:
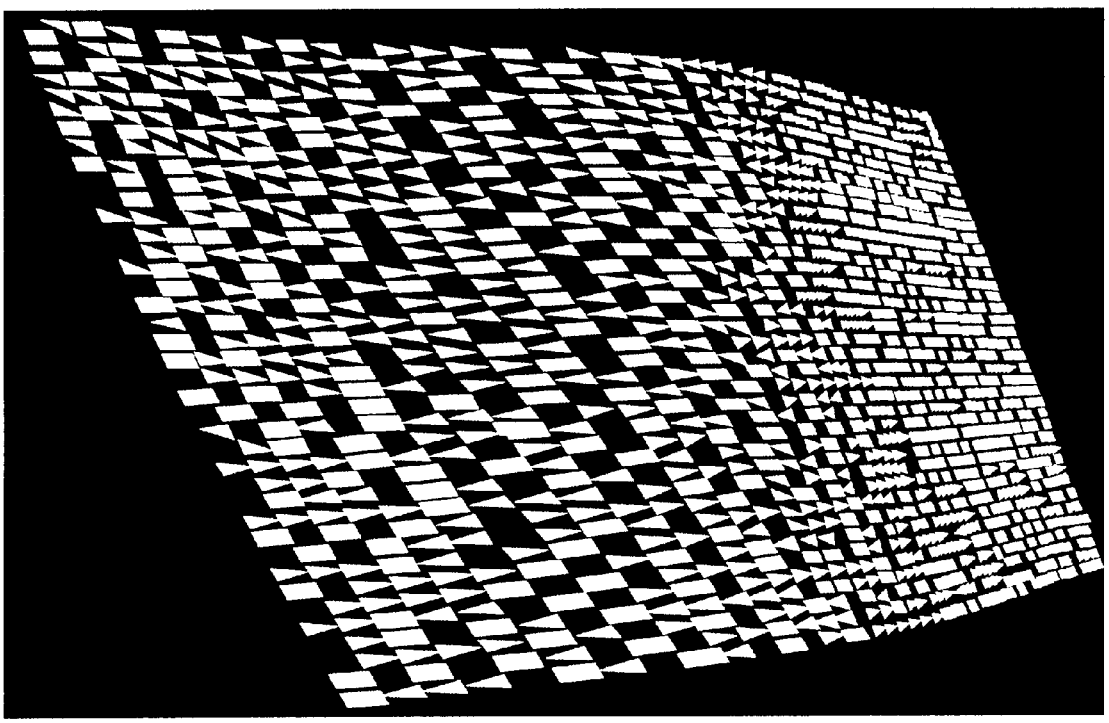
FIG. 2 shows two images of a curved surface with a pattern projected thereon.
Figure 2:
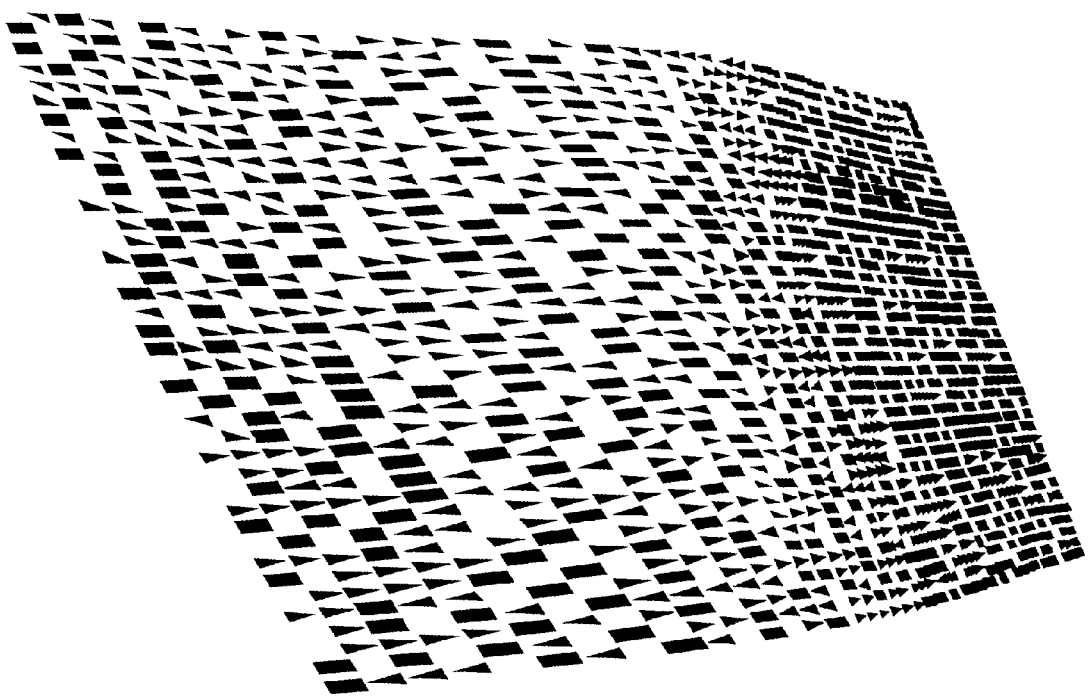
Figure 3A:
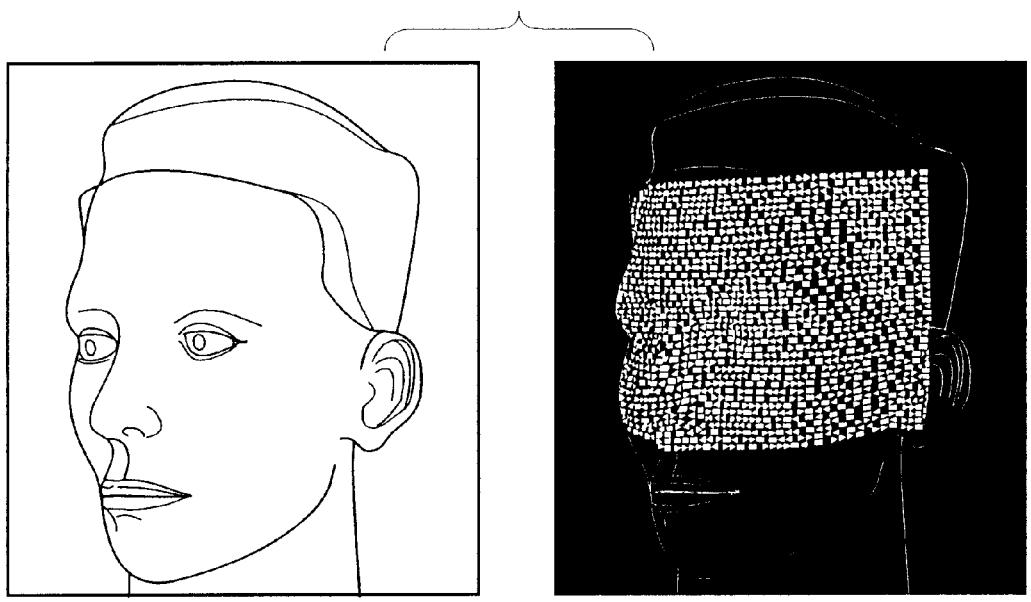
FIG. 3 shows images of a human head with and without a pattern projected thereon, from different viewing directions.
Figure 3B:
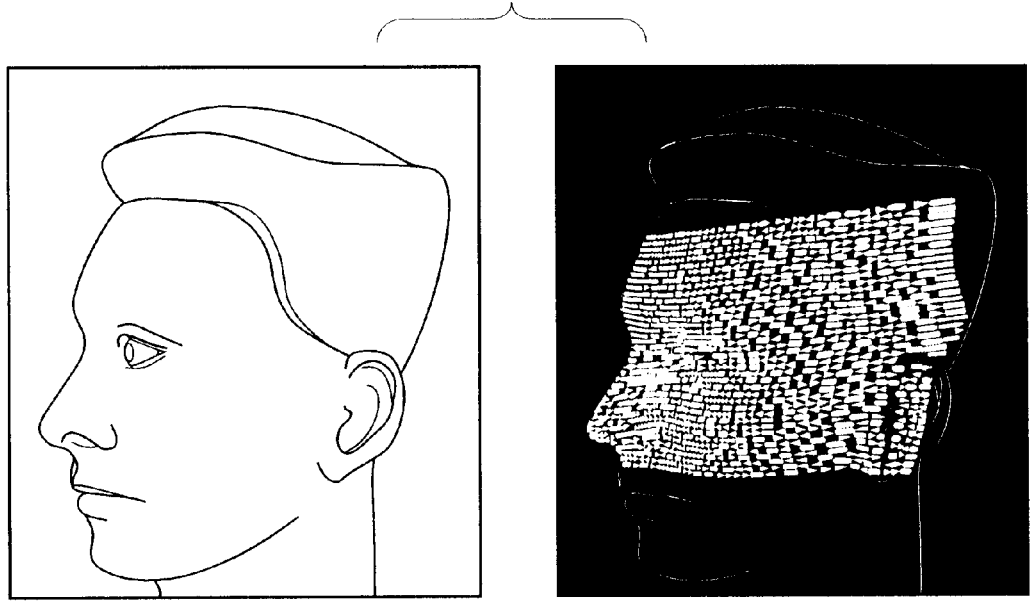

FIG. 3 shows a surface which is curved in space and on which a pattern is projected, wherein the viewing direction is the direction perpendicularly to the plane of the paper while the direction of projection on to the pattern is inclined with respect to the viewing direction by the triangulation angle. On the assumption that all perceptible pattern elements in principle occupy the same surface region, it will be noted from the distorted larger shape of those pattern elements that for example regions in which the pattern elements appear to be elongated in a horizontal direction correspond to surface regions which are heavily inclined relative to the projection direction but which are less inclined in the viewing direction, while, where the pattern elements are apparently relatively close together or appear shortened in the horizontal direction, the situation is precisely the reverse. With the relative angle between the viewing direction and the projection direction being known, it is possible to ascertain the exact position of each surface region in space. At the same time however FIG. 2 also clearly demonstrates a particular problem which would confront conventional pattern recognition processes under the illustrated imaging conditions, but which is readily overcome by the process of the present invention. More specifically, in the case of the surface whose image is formed, the incidence of light is obviously precisely such that reflections obviously occur in the right-hand edge region of the recognisable pattern, so that in that region the pattern appears substantially lighter than in the remaining region. The lower part of FIG. 2 shows a negative representation of the upper pattern so that in this case the right-hand region of the pattern appears substantially darker. That makes recognition of the pattern with conventional pattern recognition processes quite considerably more difficult or even makes it impossible. In accordance with the present invention however only the light-dark boundaries between adjacent pattern elements are detected as unambiguously located points, and those light-dark transitions are also still disposed in the region which is disturbed by a reflection and are always still clearly discernible there as such so that for example they could be unambiguously identified by the digits 0 and 1 in accordance with the evaluation procedure described hereinbefore in relation to FIG. 1.

FIG. 3 shows a specific example of use in the form of detecting the spatial structures of a human face. While the left-hand part of FIG. 3 shows in the form of a photograph the model of a human face on the one hand at about 3° with respect to the plane of symmetry on the face and on the other hand at about 75° relative to the plane of symmetry of the face, the same views are shown at the right with a pattern projected on to the face. In this case the projection direction is in the plane of symmetry of the face and substantially horizontal. With knowledge of the triangulation angle, that is to say the angle between the plane of symmetry of the face and the viewing direction, that is to say the normal to the plane of the drawing, and in addition with knowledge of the real pattern structure which would occur upon projection on to a surface perpendicular to the projection direction, it is possible on the basis of the spacings of the individual lightdark transitions in the imaged projection pattern, by means of suitable evaluation algorithms, to detect and digitally store the spatial structure of the surface of the face. That in turn can be used for the purposes of people recognition and/or for purposes in medicine, as for example in the case of computer-aided, minimal-invasive surgery.

What is claimed is:

1. A process for detecting the spatial structure of a three-dimensional surface comprising the steps of:
    (a) projecting a pattern onto the surface along a projection direction which defines a first axis,
    (b) pixel-wise detecting of at least one region of the pattern projected onto the surface, by means of one or more sensors in a viewing direction of the sensor or sensors, said viewing direction defining a second axis, wherein the first and the second axis (or a straight line parallel to the second axis) intersect at an angle different from 0° so that the first and the second axes (or a straight line parallel thereto) define a triangulation plane,
    (c) wherein the pattern is defined upon projection into a plane perpendicular to the first axis by a varying physical parameter which can be detected by the sensor (or sensors), and wherein the pattern is such that the difference in the physically measurable parameter, measured between predetermined image pixels or pixel groups, along a predeterminable pixel row which is parallel to the triangulation plane, assumes at least two different values including smooth and abrupt transitions from one value to another,
    (d) evaluating of the imaged pattern structure by only evaluating changes in the physical parameter between the predetermined pixels or predetermined pixel groups of one ore more pixel rows which are parallel to the triangulation plane and converting such predetermined pixels or predetermined pixel groups associated with said changes in the physical parameter into a binary pattern and using said binary pattern to determine spatial coordinates of the surface.

2. process as set forth in claim 1 characterised in that the difference in the physically measurable parameter between respective adjacent pixels or pixel groups is ascertained along a predetermined direction.

3. A process as set forth in claim 1 characterised in that pixels, which are disposed in mutually superposed relationship in a column of a plurality of parallel pixel rows are assembled to form a pixel group, and the changes in the physical parameter are evaluated between respective ones of such adjacent pixel groups.

4. A process as set forth in claim 1 characterised in that the pattern is an encoded pattern in which various pattern regions of an adequate size are distinguishable from each other and are fixed in respect of their position within the overall pattern.

5. A process as set forth in claim 4 characterised in that for pattern encoding and identification of the position of pattern elements, only changes are evaluated which are greater than the changes between adjacent pixels or pixel groups within the pattern elements where there are at least two types of pattern elements, in the surface region of with the measurable physical parameter is respectively of an almost constant value, wherein the value of said physical parameter clearly measurably differs between the two types of pattern elements.

6. A process as set forth in claim 1 characterised in that the pattern is formed from pattern elements which each occupy approximately equal size surface areas in a plane perpendicular to the projection direction.

7. A process as set forth in claim 6 characterised in that there are provided at least two types of pattern elements, in the surface region of which the measurable physical parameter is respectively of an almost constant value, wherein the value of said physical parameter clearly measurably differs between the two types of pattern elements.

8. A process as set forth in claim 7 characterised in that there is provided at least one type of a pattern element in which the value of the physical parameter substantially continuously changes at least within a part of its surface region along a predetermined direction.

9. A process as set forth in claim 6 characterised in that there is provided at least one type of a pattern element in which the value of the physical parameter substantially continuously changes at least within a part of its surface region along a predetermined direction.

10. A process as set forth in claim 9 characterised in that there are provided at least two types of pattern elements which differ by the sign of the change in the physical parameter within the surface region thereof and along the predetermined direction.

11. A process as set forth in claim 4 characterised in that the various types of pattern elements are arranged in an encoded distribution on the surface of the projected pattern.

12. A process as set forth in claim 4 characterised in that the various types of pattern elements are distributed in a random arrangement over the projected surface.

13. A process as set forth in claim 6 characterised in that the surface region of a pattern element in the imaging plane corresponds to an area of m×n pixels with m, n≧2 and m<<M and n<<N, wherein M×N is the total number of detected image pixels.

14. A process as set forth in claim 4 characterised in that for pattern encoding and identification of the position of pattern elements, only changes are evaluated which are greater than the changes between adjacent pixels or pixel groups within the pattern elements which occupy approximately equal-size surface areas in a plane perpendicular to the projection direction.

15. A process as set forth in claim 1 characterised in that for detecting the spatial structure of the three-dimensional surface at least two measurements with triangulation planes which are angled relative to each other are implemented and combined together.

* * * * *